C. A. FELMLEY.
STALK CUTTING MACHINE.
APPLICATION FILED JAN. 4, 1916.
1,279,680.
Patented Sept. 24, 1918.
4 SHEETS—SHEET 1.
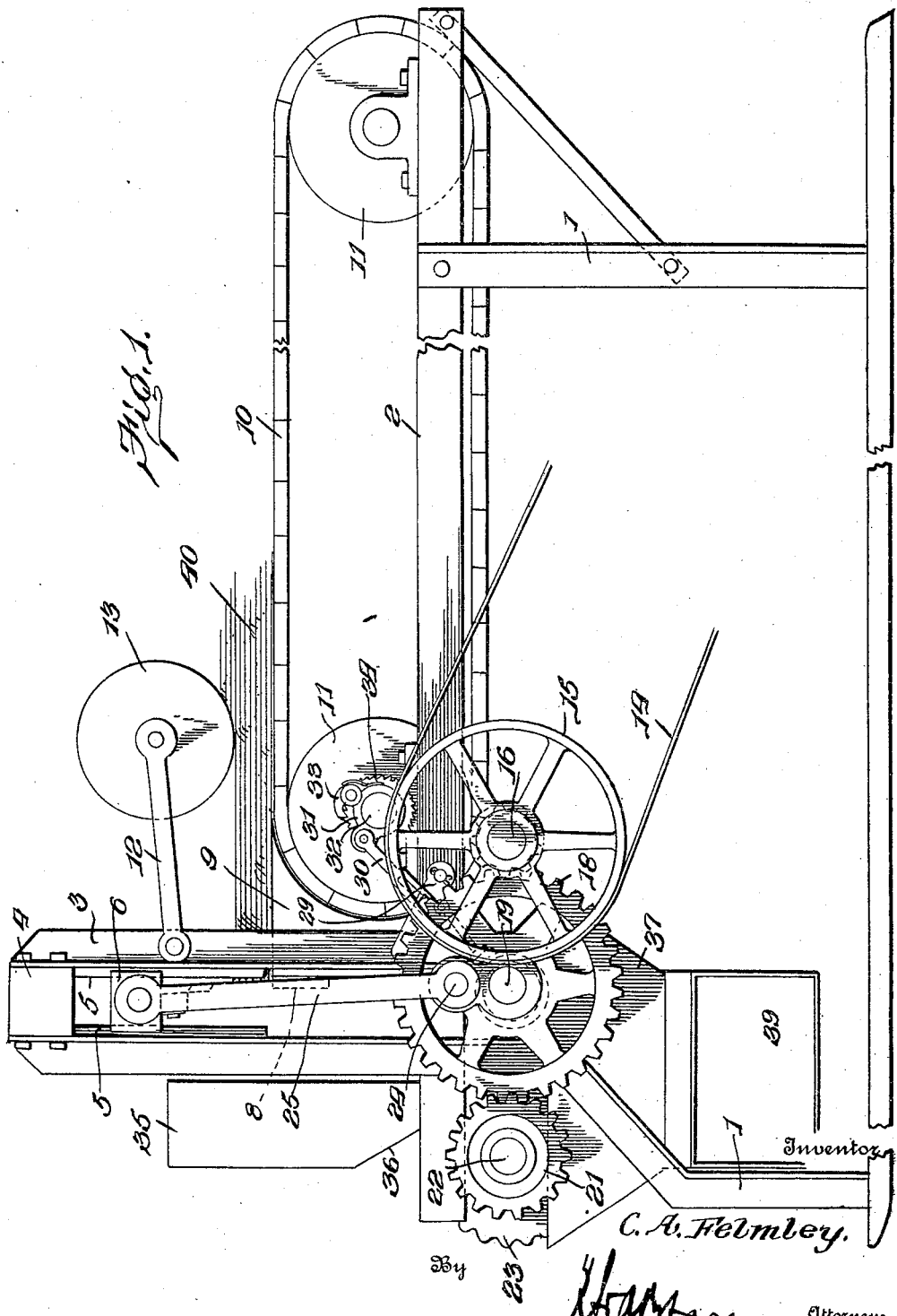

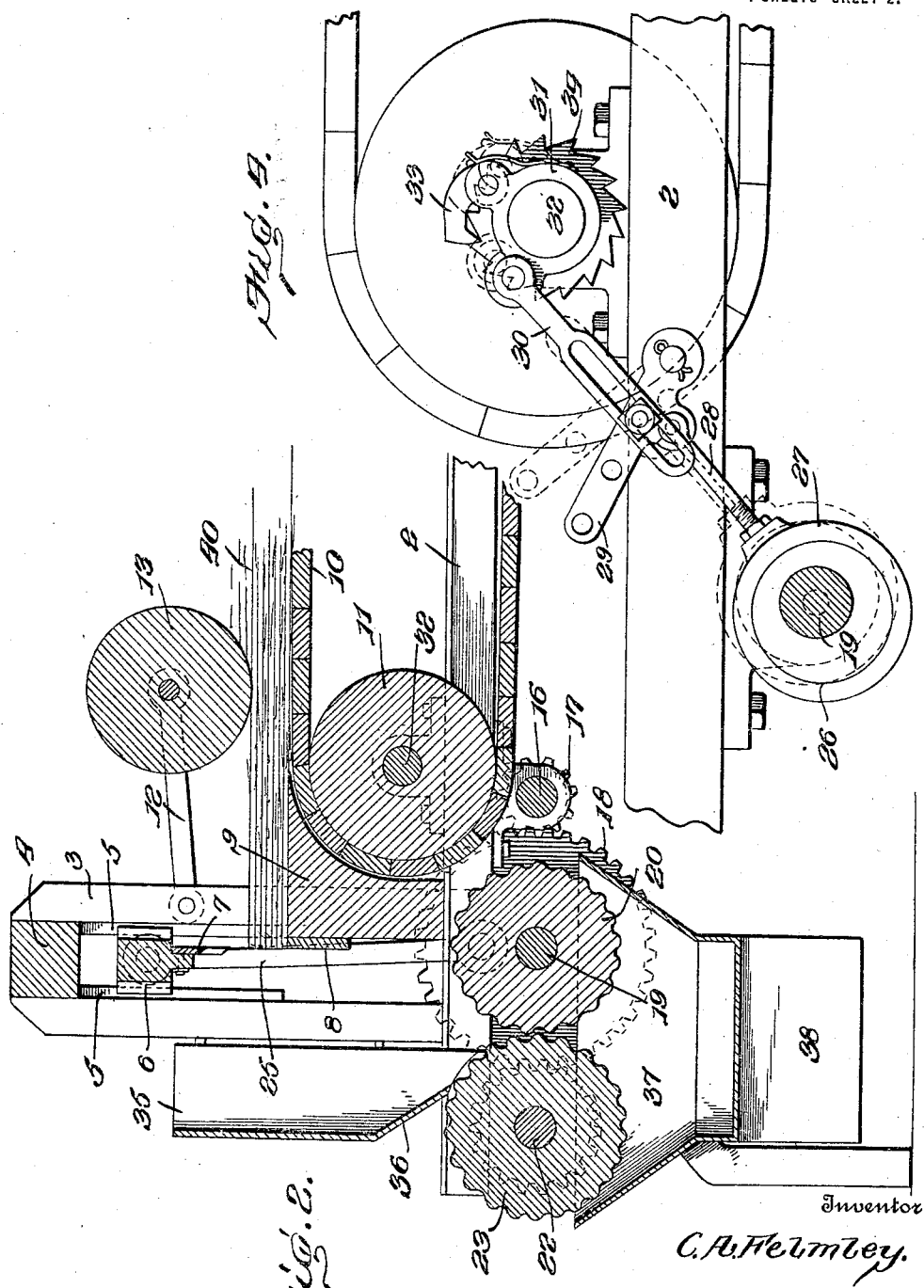

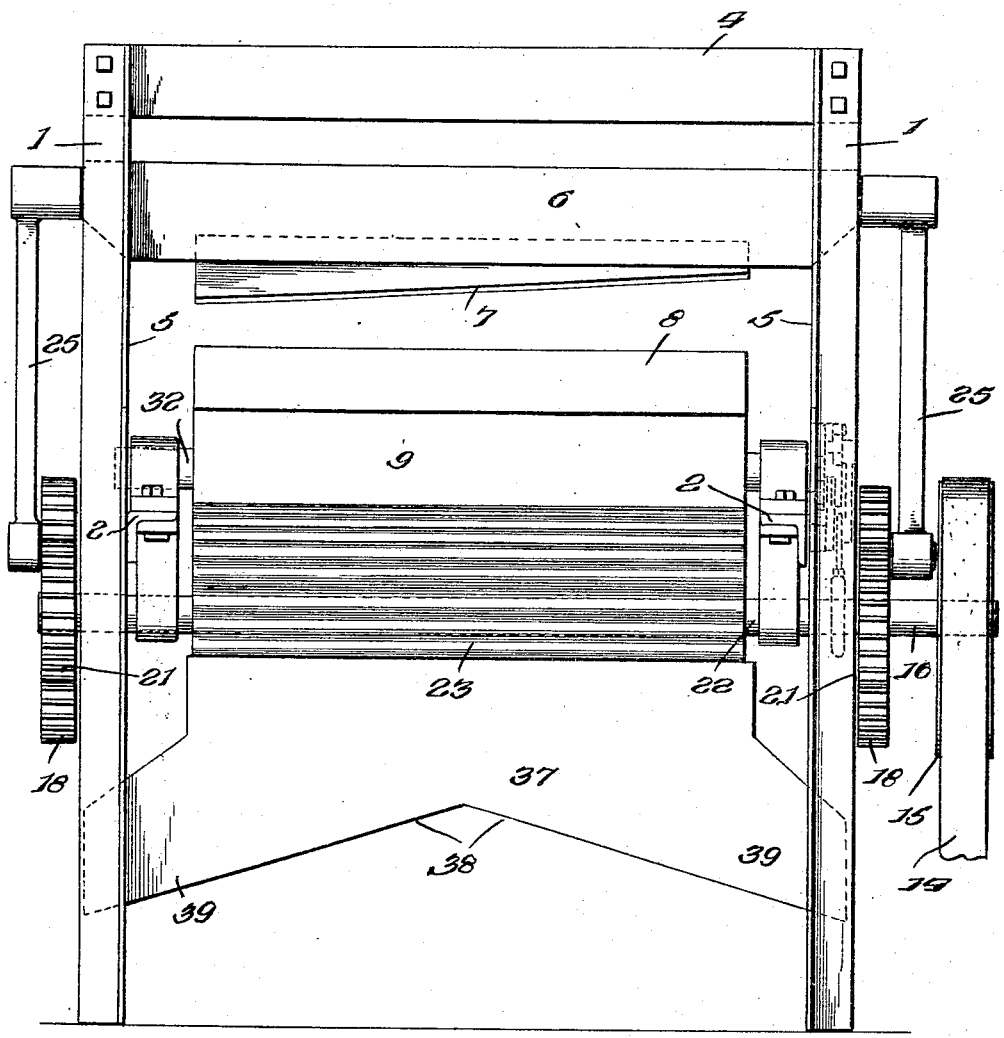

C. A. FELMLEY.
STALK CUTTING MACHINE.
APPLICATION FILED JAN. 4, 1916.
1,279,680.
Patented Sept. 24, 1918.
4 SHEETS—SHEET 4.
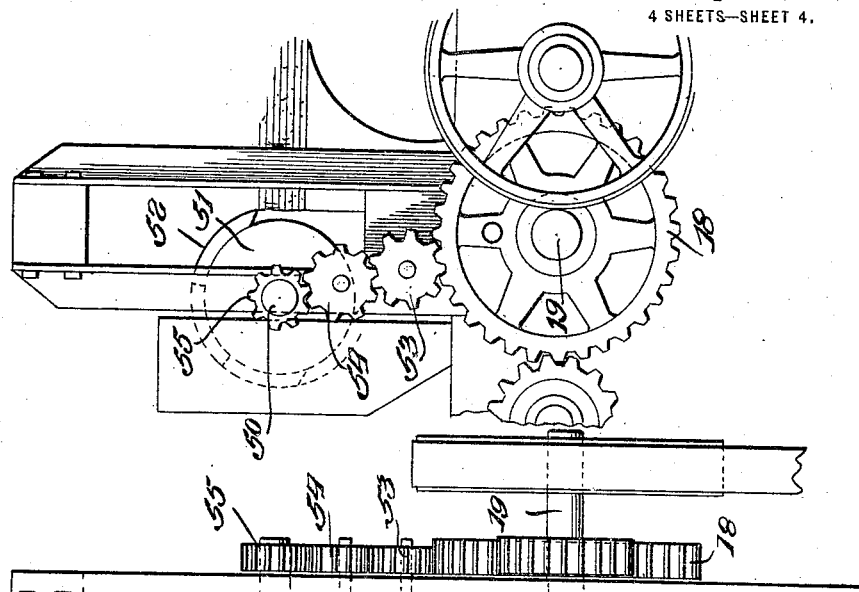
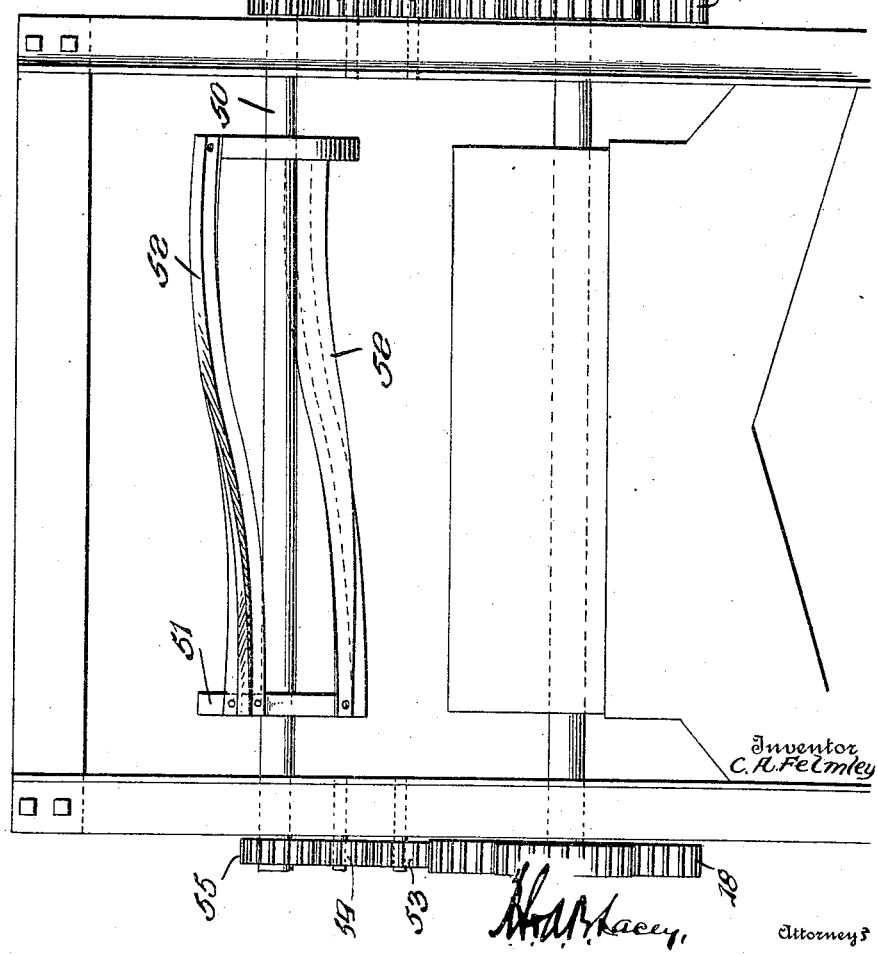

UNITED STATES PATENT OFFICE.

CALVIN A. FELMLEY, OF TACOMA, WASHINGTON.

STALK-CUTTING MACHINE.

1,279,680.     Specification of Letters Patent.     Patented Sept. 24, 1918.

Application filed January 4, 1916. Serial No. 70,233.

*To all whom it may concern:*

Be it known that I, CALVIN A. FELMLEY, a citizen of the United States, residing at Tacoma, in the county of Pierce and State of Washington, have invented certain new and useful Improvements in Stalk-Cutting Machines, of which the following is a specification.

This invention is a machine for cutting stalks of cane or other plants and reducing the same to a pulp which may be used for fertilizing the ground. The invention has for its object the provision of a machine which will be simple in construction and arrangement and efficient in operation whereby the stalks or vines fed thereto will be automatically reduced to a pulpy condition and discharged in position to be placed directly upon the plants to be fertilized or delivered into a receptacle for subsequent use.

The invention is illustrated in the accompanying drawings and consists in certain novel features which will be first fully described and then more particularly pointed out in the claim following the description.

In the drawings:

Figure 1 is a side elevation of a machine embodying my improvements;

Fig. 2 is a vertical longitudinal section taken through the cutting and crushing mechanism;

Fig. 3 is an end view with the hopper removed;

Fig. 4 is a detail view, on a larger scale, of the mechanism for operating the feeding apron or conveyer;

Fig. 5 is an end view showing another form of the invention;

Fig. 6 is a detail side view of the arrangement shown in Fig. 5.

In carrying out my invention, I employ a suitable frame consisting of standards or legs 1 which may be mounted upon runners or rollers whereby the machine may be drawn over a field between rows of plants in order to deliver the pulp directly around the roots of the plants. These standards or legs will preferably be constructed of angle iron and they support longitudinal beams 2 of similar form. Near the front ends of the longitudinal beams, the legs or standards are offset or inclined upwardly and rearwardly and elongated vertically so as to extend above the said beams and are spaced from vertical posts 3, the posts and adjacent standards being connected at their upper ends by a transverse beam 4, as shown and as will be readily understood. The opposed faces of the standards and posts are provided with guides 5 in which are mounted the ends of a cross head 6 carrying a knife 7 which is adapted to coact with a fixed blade 8 in order to cut across the stalks with a shearing cut, the edge of said knife 7 being inclined as shown most clearly in Fig. 3. The said fixed knife 8 is secured to the front face of a transverse block 9 disposed between the posts 3 and having its rear side made concave and encircling the major portion of the front turn or bight of the feeding apron or conveyer 10 which is carried around and supported by rollers or drums 11 mounted in suitable bearings upon the beams 2. It will also be noted that the upper run of this feeding apron or conveyer is in the same horizontal plane as the top surface of the block 9 so that the block lies flush with the upper run of the conveyer, whereby the upper surface of the block forms practically a continuation of the apron and stalks may pass freely from the apron to the table. Above the conveyer, arms 12 are pivoted to and extend rearwardly from the posts 3 and a roller 13 is journaled to the free ends of these arms and extends between the same so as to bear upon the stalks and partly compress them so that the ends thereof will pass under the knife 7 easily and without any tendency to strike against the same. This roller is rotated solely by frictional engagement with the stalks and is located at a substantial distance from the concave side of the block whereby its weight will tend to depress a portion of the apron at the rear of its bight portion to give stalks passing from the apron to the table an upward inclination and so prevent their ends engaging the edge of the table. It is held to the stalks by gravity so that its weight will hold it in its operative position and there will be no mechanism to adjust so that the roller may be easily lifted or withdrawn in order to guide the stalks under the same when starting the operation of the machine.

Power may be imparted to the operating mechanism from any convenient or preferred prime motor and I prefer, in actual practice, to mount a gas engine upon the frame and connect the same by a belt 14 with a band pulley 15 secured upon the end of a driving shaft 16 mounted in suitable bearings upon the frame. The driving shaft 16 extends transversely of the frame and is provided adjacent each end with a pinion 17 which meshes with a gear wheel 18 secured upon the adjacent end of a shaft 19 carrying the inner crushing roller 20. Each gear wheel 18 meshes with a similar gear wheel 21 on the adjacent end of a shaft 22 carrying the forward crushing roller 23. Both the crushing rollers are longitudinally corrugated upon their circumferential surfaces and it will be readily noted that, as the actuating gears are of different diameters, one roller will rotate at a higher speed than the other roller, thereby exerting a disintegrating as well as a crushing force upon the stalks fed between them so that the pieces of stalk will be ground into a pulp. Each gear wheel 18 is provided with a wrist pin 24 on which is pivoted the lower end of a pitman 25 which has its upper end pivoted to the adjacent end of the cross head 6 so that, as the gear wheels are rotated, vertical reciprocatory movement will be imparted to the cross head and the knife carried thereby. An eccentric or cam 26 is secured upon the shaft 19 and to the strap 27 of said eccentric is secured an eccentric rod 28 which is pivoted to an actuating lever 29 fulcrumed upon the adjacent longitudinal beam 2. To the said lever 29 is adjustably secured a pitman 30 having its upper end pivotally attached to a collar 31 which is loosely mounted upon the end of the shaft 32 carrying the roller or drum 11. A pawl 33 is pivotally mounted upon the collar 31 and this pawl is adapted to ride upon and engage a ratchet wheel 34 which is fixed to the shaft 32. It will thus be readily understood that, as the pitman 30 is reciprocated, the collar 31 will be oscillated upon the shaft 32 and the pawl, consequently, caused to operatively engage the ratchet 34 and thereby transmit a step by step movement to the shaft 32 and the drum 11 so that the feeding apron 10 will advance the stock intermittently to the cutters. The adjustable connection of the pitman and the lever 29 will enable the operator to arrange the parts so as to compensate for wear and will also enable him to accurately time the movement of the feeding apron and the cutters so that the stock will be fed to the cutters uniformly and delivered in pieces of uniform length.

A deflector or hood 35 is secured across the front end of the machine and has an open rear side so that the proper movement of the pieces of the stalk from the cutters will not be impeded. The lower end of the front wall of the hopper is bent inwardly, as shown at 36, so as to direct the cut pieces of stalks into the bight between the crushing rollers 20 and 23 so that all stock will be delivered to said rollers. Below the crushing rollers is a receiver 37 which has closed ends and sides downwardly converging, and has its bottom inclined toward both ends from its central point, as indicated at 38, thereby providing two discharge spouts 39 whereby the pulp will be delivered at the sides of the machine.

It is thought the operation of the machine will be readily understood from the foregoing description, taken in connection with the accompanying drawings. The stalks and vines which may be cut down from the plants are placed upon the feeder apron 10, as indicated at 40, and will be carried by said apron to the cutters and the crushing rollers. As the ends of the stalks move beyond and over the block 9 and the fixed knife 8, the cross head 6 is brought down so as to carry the knife 7 across the ends of the stalks and thereby cut the same into short lengths. The short pieces of stalks drop to the corrugated crushing rollers and are then acted upon by said rollers so as to be crushed and disintegrated and passed from the said rollers in the form of a pulp which will emerge from the spouts 39. If the machine be drawn over a field between two rows of growing plants, the pulp may be delivered upon the ground directly around the stems of said plants or, if preferred, the machine may remain stationary and the pulp delivered into suitable receptacles from which it may be subsequently applied when needed.

My machine is very simple in the construction and arrangement of its parts and will be found highly efficient in operation. By its use the stalks and vines which are now permitted to dry and then burned, may be advantageously employed as fertilizer so as to enrich the ground and prevent the same becoming barren.

It is to be understood that I do not limit myself to the exact details I have described and that various changes may be made therein without departing from the spirit or scope of the invention as the same is defined in the following claim.

One modification is illustrated in Figs. 5 and 6 in which a shaft 50 is substituted for the cross head 6 and journaled in suitable bearings upon the frame approximately in the horizontal plane of the advancing stock. Between the standards or sides of the frame, this shaft is equipped with a cutter head 51 upon which are secured knives 52 of an ogee or approximately spiral form so that they will exert a drawing or shearing cut upon the stock lying upon and projecting over the lower stationary knife. The shaft 19 and its gear wheels 18 are retained in this modified arrangement but, instead of the pitmen 25, I provide pinions 53 and 54 upon the sides of the frame which are driven directly by the wheels 18 and transmit the motion of the same directly to pinions 55 on the shaft 50. It is my intention to supply both forms of cutters and gearing with each machine so that they may be interchanged according to the preference of the user or peculiar characteristics of the stock being treated.

In both forms of the apparatus the block 9 fits close to and partly around the roller which supports the front end of the feeding apron and the upper surface of the block is flush with the upper surface of the apron so that stalks cannot drop between the block and the apron and choke the operation but must pass to the cutters. The block also forms an abutment to sustain the stalks under the movable knife and also forms a rear guide and guard to direct the cut pieces and stalks to the crushing rollers and prevent such pieces falling in rear of said rollers.

Having thus described the invention, what is claimed as new is:

In a stalk cutting machine, a supporting frame, an endless feeding apron mounted thereon, a table forming block carried by the frame with its upper surface substantially flush with the upper surface of the feeding apron and with its rear side concaved to fit closely to and encircle the major portion of the front bight end of the feeding apron, and a relatively heavy roller swingingly supported to rest by gravity upon stalks carried by the apron and mounted to revolve solely by frictional engagement with the stalks, the roller being located at a substantial distance from the concave side of the block whereby its weight will tend to depress a portion of the apron at the rear of its bight portion to give stalks passing from the apron to the table an upward inclination and so prevent their ends engaging the edge of the table.

In testimony whereof, I affix my signature.

CALVIN A. FELMLEY. [L. S.]

Copies of this patent may be obtained for five cents each, by addressing the "Commissioner of Patents, Washington, D. C."